United States Patent

Hutchins et al.

[11] Patent Number: 4,578,764
[45] Date of Patent: Mar. 25, 1986

[54] SELF-CONFIGURING ROBOTIC SYSTEM AND METHOD

[75] Inventors: Burleigh M. Hutchins, Hopkinton; William J. Buote, Natick; Lawrence J. Finn, Westborough, all of Mass.

[73] Assignee: Zymark Corporation, Hopkinton, Mass.

[21] Appl. No.: 472,642

[22] Filed: Mar. 7, 1983

[51] Int. Cl.[4] .............................................. G06F 9/00
[52] U.S. Cl. .................................. 364/513; 364/131; 901/2; 901/8
[58] Field of Search ........................................ 901/2-8, 901/30-38, 40-45, 50; 29/701; 318/568, 576; 364/131, 132, 134, 135, 138, 139, 140, 167, 171, 474, 513, 191, 192, 193

[56] References Cited

U.S. PATENT DOCUMENTS

| | | | |
|---|---|---|---|
| 4,187,051 | 2/1980 | Kirsh et al. | 901/9 X |
| 4,253,148 | 2/1981 | Johnson et al. | 364/200 |
| 4,262,336 | 4/1981 | Pritchard | 364/132 |
| 4,281,379 | 7/1981 | Austin | 364/132 |
| 4,306,803 | 12/1981 | Donohue et al. | 364/131 |

Primary Examiner—Jerry Smith
Assistant Examiner—Allen MacDonald
Attorney, Agent, or Firm—Andrew F. Kehoe

[57] ABSTRACT

A self-configuring robotic system and method are disclosed. The system employs a computer having a central processing unit and an operating system containing at least a nucleus, a sequence reprogrammer and task support services. A robotic device and at least one defined task performing device, which may be another robotic device, are used in the system. Each device has a corresponding module that is electrically connected to the device and provides all of the intelligence for the particular device. Each module also provides a control block flag and a starting offset for the computer. The modules are electrically connected to the computer through a plurality of physically separable electrical connections so that all of the intelligence for the devices is on the device side of the associated physically separable electrical connections.

10 Claims, 3 Drawing Figures

SELF-CONFIGURING ROBOTIC SYSTEM AND METHOD

BACKGROUND OF THE INVENTION

The present invention relates to robotic systems in general and, more particularly, to a self-configuring robotic system and method.

The recently articulated concern about "productivity" in the industrialized countries of the world has focused attention upon the role of robotics in society. Robots currently are utilized in a number of industries, such as, the automotive industry, to perform repetitive tasks in an environment that is often hazardous or unpleasant for human beings.

The robots are programmed to perform different tasks with the intelligence for each robot being either self-contained within the robot or resident in one or more generally centralized computers that control the robot. Although these two types of architecture are perfectly functional, they each have drawbacks in terms of robotic system configuration and reconfiguration. In the case of self-contained robots, each robot must be reprogrammed because there is no commonality of central computer usage or sequential control of a plurality of robots. Each robot essentially is autonomous. The opposite architectural configuration of centralized computer control requires reprogramming with no off-loading of computer tasks to the robotic device.

Accordingly, it is a general object of the present invention to provide a self-configuring robotic system with a novel archiecture.

It is a specific object of the invention to provide a self-configuring robotic system in which all robotic device intelligence is on the device side of physically separable electrical connections to a computer that has a central processing unit and an operating system containing at least a nucleus, a sequence reprogrammer and task support services.

It is another object of the invention to provide a robotic system in which each robot or defined task performing device has an associated module that is electrically connected to the robot or device and which contains all of the intelligence for the particular device and a control block flag and starting offset for the system computer.

It is a further object of the invention to provide a self-configuring robotic system in which each device module is electrically connected to the system computer through physically separable electrical connections so that system configuration and reconfiguration can be accomplished by "plugging in" the desired modules and their asssociated devices.

These objects and other objects and features of the invention will best be understood from a detailed description of a preferred embodiment of the invention and shown in the accompanying drawings, in which.

DETAILED DESCRIPTION OF THE INVENTION

Figure 1:
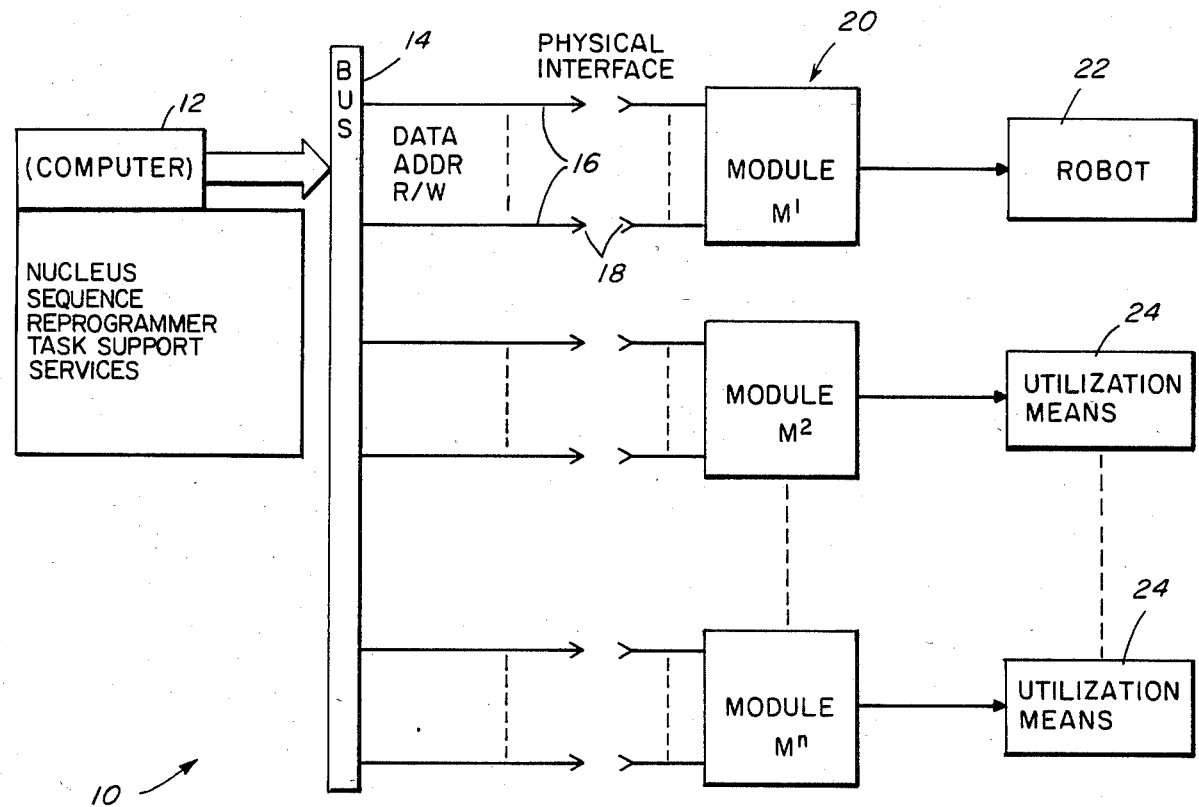
FIG. 1 is a block diagram of the self-configuring robotic system.
Figure 2:
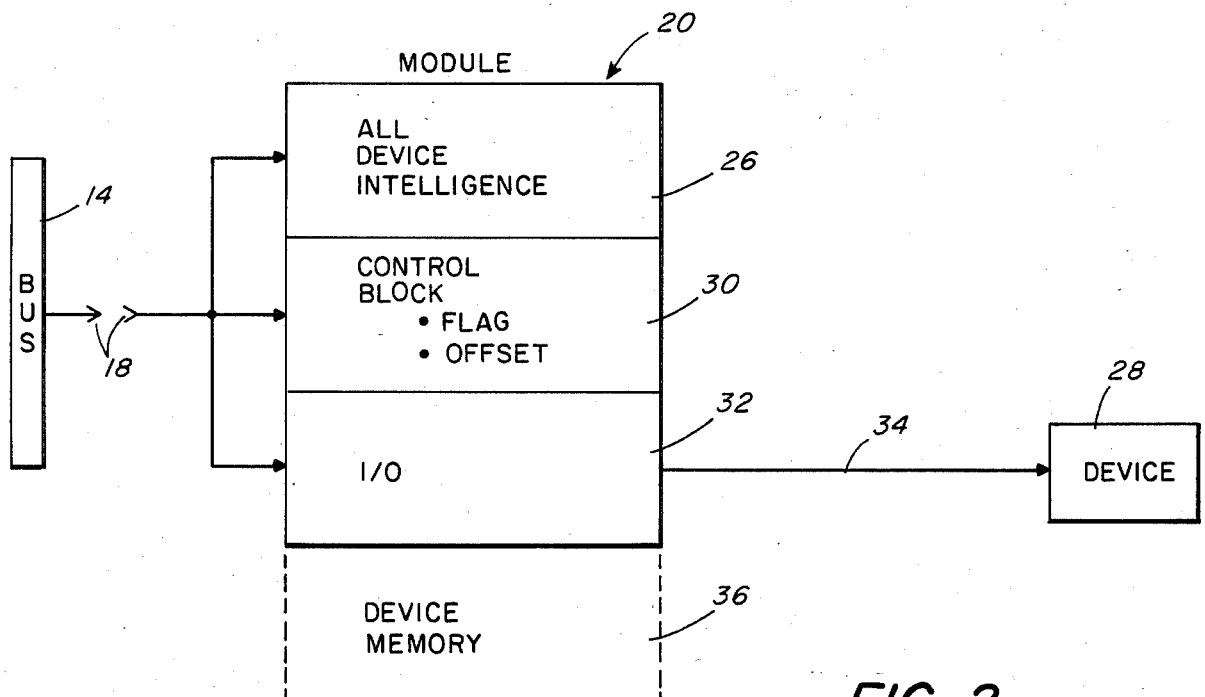
FIG. 2 is a block diagram showing the module of FIG. 1 in greater detail.

Turning now to the drawings, and particularly to FIGS. 1 and 2 thereof, there is shown in block diagram form a robotic system constructed in accordance with the present invention and indicated generally by the reference numeral 10. The robotic system 10 utilizes a conventional computer 12 having an operating system containing at least a nucleus, a sequence reprogrammer and task support services. Computer bus 14 includes at least data, address and read/write lines 16 that are electrically connected through physically separable connections 18 to a module indicated generally by the reference numeral 20.

The structure of module 20 will be discussed below in connection with FIG. 2. For now, it is sufficient to note that module 20 is electrically connected to a robot 22. The term "robot", as used herein, means: "A reprogrammable, multifunction manipulator designed to move material, parts, tools, or specialized devices through variable programmed motions for the performance of a variety of tasks." This is the definition for the term "robot" that has been adopted by The Robotics Institute of America.

As shown in FIG. 1, the robotic system of the present invention includes at least one other module ($M^2$) that is electrically connected to a utilization means 24. The utilization means 24 can comprise either another robot 22 or a means for performing a defined task. Expansion of the robotic system is provided for through the use of additional utilization means and associated modules, e.g. module ($M^n$).

The detailed structure of modules 20 is illustrated in the block diagram of FIG. 2. Each module contains all of the device intelligence 26 for its associated device 28. Device 28 generically represents the previously mentioned robot 22 and utilization means 24. The module 20 also contains a control block 30 having a control block flag and a starting offset for computer 12 and an appropriate input/output interface 32 between the computer 12 and the device 28. If desired, the module 20 can also include device memory 36 represented by the dashed lines in FIG. 2.

The device intelligence 26 contained within module 20 can be stored in a variety of conventional forms. For example, the device intelligence can be stored in read-only memories (ROM'S).

It will be appreciated from the preceding description of the hardware structure of the robotic system that each device 28, whether it be a robot 22 or a utilization means 24, has an associated module 20 that contains all of the intelligence for the particular device. The associated module also provides a control block flag and starting offset for the computer and an appropriate I/O interface between the computer and device 28. Each module is electrically connected to the common computer bus 14 through a plurality of the separable electrical connections 18. It should be noted that all of the device intelligence is on the device side of the physical interface formed by the separable electrical connections 18.

Thus, in configuring or reconfiguring a system, it is possible to simply plug the appropriate device module 20 into the computer bus 14 because the module contains all of the corresponding device intelligence, the appropriate control block information for computer 12 and the input/output interface between the device and the computer. This particular system architecture greatly simplifies the implementation and configuration of a specific robotic system to accommodate the needs of an end user. Since the device and its associated module constitute a separable unit, various predefined task performing devices can be attached to or removed from the robotic system 10 simply by plugging in or removing the appropriate module 20.

Figure 3:
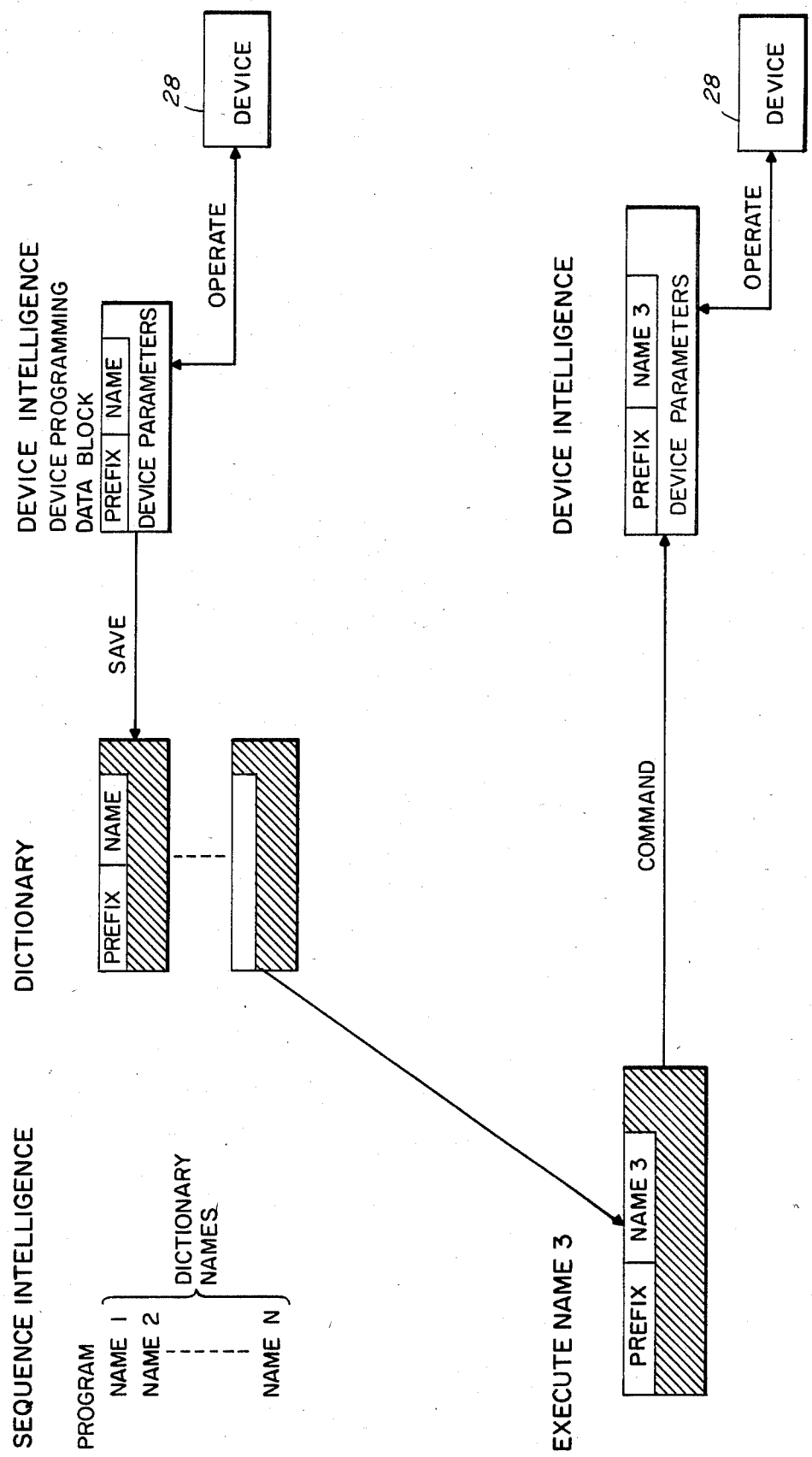
FIG. 3 is a data flow diagram illustrating the data flow paths in the self-configuring robotic system.

Turning now to FIG. 3, there is shown a data flow diagram for the robotic system of the present invention. Referring to the upper righthand corner of FIG. 3, device 28 is initially programmed using the device intelligence to produce a data block containing a device identifying prefix, data block name selected by the "End User" and device parameters for the specific device. The data block is saved in a dictionary that contains a plurality of data blocks each with a prefix and name and associated device parameters. The sequence intelligence for controlling the sequential operation of the devices is contained in a program for computer 12. The program, which has the dictionary names, defines the sequence in which the data blocks are obtained from the dictionary and executed. The sequence intelligence and the dictionary need not be able to decode the device parameters, as indicated by the shaded sections of the data blocks under dictionary in FIG. 3. By way of illustration, FIG. 3 depicts the data flow for execution of Name 3 from the dictionary. A command is issued to the device intelligence to pass the "Name 3" device parameters to the prefix identified device 28 causing operation of the device in accordance with the stored device parameters.

Thus, the system described above may be operated—even though it be augmented with a wholly new robotic device by (1) searching for and finding the control block flag in one of the moldule means;

(2) creating an initialization task in response to finding the control block flag in said one of the module means;

(3) starting said initialization task;

(4) initializing the associated robotic device means from the intelligence contained in said one module means; and (5) repeating steps 1 through 4 for each one of the other robotic device means until the plurality of robotic device means has been initialized.

Having described in detail a preferred embodiment of our invention, it will now be apparent to those skilled in the art that numerous modifications can be made therein without departing from the scope of the invention as defined in the following claims.

What we claim and desire to secure by Letters Patent of the United States is:

1. A robotic system comprising:
a robotic device means;
a first module means for providing all of the intelligence for said robotic device means, said module means being electrically connected to said robotic device means;
computer means;
a first physical interface means for providing a plurality of separable electrical connections between said computer means and said first module means so that all of the intelligence for the robotic device means is located on the robotic device means side of the physical interface means;
means for performing a defined task;
a second, different, module means for providing all of the intelligence for said defined task performing means, said module means being electrically connected to said defined task performing means; and,
a second physical interface means for providing a plurality of separable electrical connections between said computer means and said second module means so that all of the intelligence for the defined task performing means is located on the defined task performing means side of the physical interface means.

2. The robotic system of claim 1 wherein said physical interface means provides separable electrical connections between said computer means and said module means for at least data, address, and read and write.

3. The robotic system of claim 1 wherein said module means further comprises means for providing a control block flag and starting offset for said computer means and means for providing an input/output interface between the computer means and said robotic device means.

4. A robotic system comprising:
a plurality of robotic device means;
a corresponding plurality of different module means with module means providing all of the intelligence for corresponding different robotic device means, and being electrically connected thereto;
computer means; and,
a corresponding plurality of physical interface means each providing a plurality of separable electrical connections between said computer means and the corresponding module means so that all of the intelligence for each robotic device means is located on the robotic device means side of the associated physical interface means.

5. The robotic system of claim 4 wherein each said physical interface means provides separable electrical connections between said computer means and the corresponding module means for at least data, address and read and write.

6. The robotic system of claim 5 wherein each said module means further comprises means for providing a control block flag and starting offset for said computer means and means for providing an input/output interface between the computer means and the corresponding robotic device means.

7. A self-configuring robotic system comprising:
computer means having a central processing unit and an operating system that contains at least a nucleus, a sequence reprogrammer and task support services;
a plurality of different robotic device means:
a corresponding plurality of different module means with each module means providing all of the intelligence for a corresponding robotic device means and being electrically connected to said corresponding robotic device, each said module means having means for providing a control block flag and starting offset for said computer means and means for providing an input/output interface between the computer means and the corresponding robotic device means; and,
a corresponding plurality of physical interface means each providing a plurality of separable electrical connections between said computer means and each of such corresponding module means so that all of the intelligence for each robotic device means is located on the robotic device means side of the associated physical interface means.

8. A self-configuring robotic system comprising:
computer means having a central processing unit and an operating system that contains at least a nucleus, a sequence reprogrammer and task support services;

a robotic device means;

a first module means providing all of the intelligence for said robotic device means and being electrically connected to said robotic device, said module means having means for providing a control block flag and starting offset for said computer means and means for providing an input/output interface between the computer means and said robotic device means;

a first physical interface means for providing a plurality of separable electrical connections between said computer means and said module means so that all of the intelligence for the robotic device means is located on the robotic device means side of the physical interface means;

means for performing a defined task;

a second and different module means providing all of the intelligence for said defined task performing means and being electrically connected thereto, said second module means having means for providing a control block flag and starting offset for said computer means and means for providing an input/output interface between the computer means and said defined task performing means;

a second physical interface means for providing a plurality of separable electrical connections between said computer means and said second module means so that all of the intelligence for the defined task performing means is located on the defined task performing means side of the physical interface means.

9. A method for self-configuring a robotic system that comprises:

a robotic device means;

a first module means for providing all of the intelligence for said robotic device means, said module means being electrically connected to said robotic device means;

computer means having a central processing unit and an operating system that contains at least a nucleus, a sequence reprogrammer and task support services;

a first physical interface means for providing a plurality of separable electrical connections between said computer means and said first module means so that all of the intelligence for the robotic device means is located on the robotic device means side of the physical interface means;

a task device means for performing a defined task;

a second module means for providing all of the intelligence for said defined task performing device means, said module means being electrically connected to said defined task performing device means; and, a second physical interface means for providing a plurality of separable electrical connections between said computer means and said second module means so that all of the intelligence for the defined task performing device means is located on the defined task performing device means side of the physical interface means;

said method comprising the steps of:
1. searching for and finding the control block flag in one of the module means;
2. creating an initialization task in response to finding the control block flag in said one of the module means;
3. starting said initialization task;
4. initializing the associated device means from the intelligence contained in said one module means; and,
5. repeating steps 1 through 4 for the other module means and its associated device means.

10. A method for self-configuring a robotic system that comprises:

a plurality of robotic device means;

a corresponding plurality of module means with each module means providing all of the intelligence for the corresponding robotic device means, and being electrically connected thereto;

computer means having a central processing unit and an operating system that contains at least a nucleus, a sequence reprogrammer and task support services; and, a corresponding plurality of physical interface means each providing a plurality of separable electrical connections between said computer means and the corresponding module means so that all of the intelligence for each robotic device means is located on the robotic device means side of the associated physical interface means;

said method comprising the steps of:
1. searching for and finding the control block flag in one of the module means;
2. creating an initialization task in response to finding the control block flag in said one of the module means;
3. starting said initialization task;
4. initializing the associated robotic device means from the intelligence contained in said one module means; and,
5. repeating steps 1 through 4 for each one of the other robotic device means until the plurality of robotic device means has been initialized.

* * * * *